May 15, 1951     J. E. SURLINE     2,552,602
MAGNETO GAUGE
Filed Oct. 11, 1946
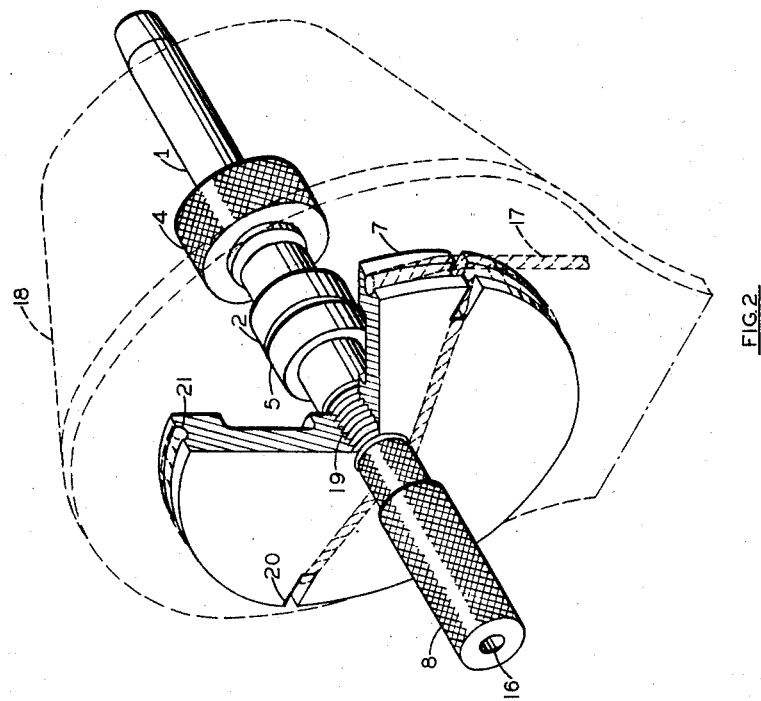
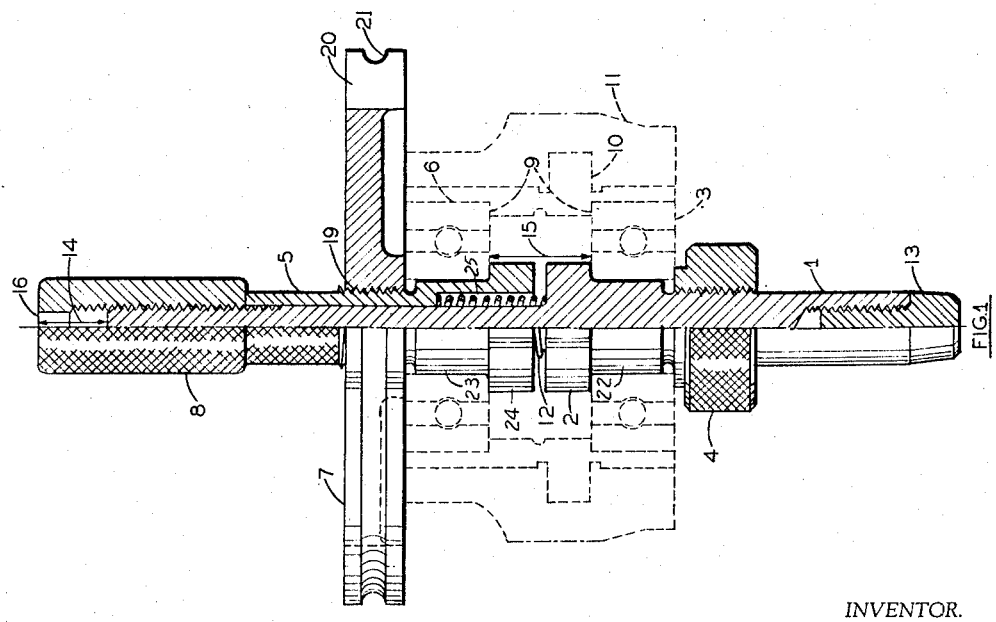
INVENTOR.
JACK E. SURLINE
BY
ATTORNEY Patented May 15, 1951

2,552,602

UNITED STATES PATENT OFFICE 2,552,602

MAGNETO GAUGE

Jack E. Surline, Philadelphia, Pa.

Application October 11, 1946, Serial No. 702,567

10 Claims. (Cl. 33—181)

(Granted under the act of March 3, 1883, as amended April 30, 1928; 370 O. G. 757)

This invention relates to new and useful improvements in magneto assembly tools, and more particularly to a gage for spacing bearings on the ignition cam shaft.

In the assembly of certain magnetos used to furnish ignition current for aircraft automotive engines, an exact spacing is required of the two ball-bearings supporting the shaft carrying the cam which operates the make-and-break mechanism. The design of said magneto is such that these two bears must be assembled in their housing, and held and spaced apart as to be preloaded, so as to revolve under these conditions within certain torque requirements. This condition is maintained so that there will be no play or shake in the shaft on which these bearings are mounted. Such play, if it existed, would cause a variation in the timing of the spark in the various cylinders of the engine for which the said magneto is used in the ignition system.

The assembly of these bearings in their housing and the supporting of said cam shaft without play or shake, on the one hand, and without undue preloading such as to cause excessive wear and deterioration under normal operation, on the other hand, is a difficult mechanical procedure which this gage is intended to simplify. The adjustment for the amount of preloading of the ball-bearings on the cam shaft is accomplished by the proper selection, as to length, of a spacer which spaces apart the inner races of the two ball-bearings. The gage measures the necessary length of this spacer to give the required preloading of the said ball-bearings, and allows for the measurement and application of the required shaft torque, under which the said bearings are to operate.

The principal object of this invention is to provide a gaging mechanism which will measure the required length of a bearing spacer which preloads a pair of ball-bearings on a magneto cam shaft so that they will revolve, when assembled on their housing mounting and supporting shaft, with a specified torque.

Another object is to provide an adjustable torque measuring device so that a pair of ball-bearings on a magneto cam shaft can be assembled in their housing and so spaced apart as to revolve, with their supporting shaft, within a specified torque requirement.

Still another object of this invention is to provide a gaging mechanism which permits the assembly of a pair of ball-bearings in a simple and time saving manner so that as the bearings are mounted under operating conditions, they will operate within a specified torque range and loading.

A further object of this invention is to provide an outside measuring device so that the length of the required bearing spacer can be measured with an ordinary depth micrometer, or any other suitable measuring device, easily and quickly, without any particular mechanical skill being required, and with the ball-bearings mounted in their housing and having the required preloading as specified.

These and other objects of this invention and the various features and details of the construction, operation and use thereof, are hereinafter more fully set forth and described with reference to the accompanying drawing in which like numbers refer to like parts and in which:

Fig. 1 is a half sectional view of my invention with bearings and the gaging mechanism in place, and Fig. 2 is an isometric view of a magneto housing with the gage located in its bearings (not shown).

Referring now to Figs. 1 and 2, reference numerals 3 and 6 designate ball-bearings having their outer races bearing against shoulders 9 of bearing retainer 10, fixed in a magneto housing 11.

Numeral 1 designates a spindle having a two-step flange portion intermediate the ends thereof comprising a journal 22 portion and flange 2 portion to receive the inner race of ball-bearing 3 in snug engagement thereon and thereagainst, respectively. A knurled nut 4 threadedly engages said spindle and is drawn against the inner race of ball bearing 3 to clamp the inner race tightly against flange 2. A threaded plug 13 is screwed axially into the end of the spindle. This plug is of non-ferrous material to receive light mallet blows to aid in the disengagement of the bearings.

The other end of spindle 1 is provided with a sleeve 5 having a two-step flange portion at the end thereof comprising a journal 23 and flange 24 which receives the inner race of ball-bearing 6 in snug engagement thereon and thereagainst, respectively. A sheave 7 threadedly engages said sleeve at 19 and is drawn against the inner race of ball-bearing 6 to clamp the inner race tightly against flange 24. Micrometer nut 8 threadedly engages the end of the spindle and bears against the end of sleeve 5 to adjust the position of said sleeve and its associated inner race toward the fixed inner race of ball-bearing 3, thereby lightly loading the bearings. The amount of pre-loading is adjusted so that the ball bearings just revolve within specified torque limits applied to sheave 7 thru cord 17 secured in slots 20 and guided in groove 21.

The gage is so designed that when assembled in place between two subsequently preloaded ball-bearings, the distance 15 being the length of the required spacer (not shown) is identical with the distance 14 measured from the end of the spindle to the outer end of knurled nut 8 and easily measured by a depth micrometer (not shown) through bore 16. The gage measures the length of the spacer necessary to give the required pre-loading on said ball-bearings for the best operating conditions. The flange end of sleeve 5 is counterbored at 25 to receive a compression spring 12 which tends to spring load said sleeve thereby allowing better adjustment.

While a particular embodiment of this invention has been illustrated and described herein, it is not intended that this invention be limited to such disclosure, and changes and modifications may be made and incorporated within the scope of the claims.

The invention described herein may be manufactured and used by or for the Government of the United States of America for governmental purposes without the payment of any royalties thereon or therefor.

I claim:

1. A gage, comprising: a rod-like axis member having means thereon to receive a first ball-bearing coaxially therewith and in fixed engagement thereon; a member movable axially on said axis member and having means to receive a second ball-bearing coaxially therewith and in fixed engagement thereon and spaced from said first ball-bearing; and an elongated micrometer nut engaged with said axis member to bear against the other member, said elongated micrometer nut being so constructed and arranged that it always extends beyond the end of said axis member an amount proportional to the distance between the ends of the first-mentioned and second-mentioned means adjacent their respective ball-bearings.

2. A gage, comprising: a rod-like axis element having means thereon to fixedly receive thereagainst a first ball-bearing coaxially therewith intermediate the ends thereof; a sleeve slidably engaged on one end of said element and having means to fixedly receive thereagainst a second ball-bearing coaxially therewith and spaced from said first ball-bearing; and an elongated micrometer nut threadedly engaged with said one end of said element to bear against said sleeve, said elongated micrometer nut being so constructed and arranged that it always extends beyond said one end of said element an amount proportional to the distance between the ends of the first-mentioned and second-mentioned means against which are received their respective ball-bearings.

3. The gage described in claim 2 and a compression spring between said element and said sleeve to spring load said sleeve.

4. A gage, comprising: an axis element having a two-step portion intermediate the ends thereof comprising a journal and a flange adapted to receive a first ball-bearing thereon and thereagainst, respectively; a nut threadedly engaged with said element to force the inner race of said ball-bearing against said flange; a sleeve slidably engaged on the end of said element opposite said nut said sleeve having a two-step end portion comprising a journal and a flange adapted to receive a second ball-bearing thereon and thereagainst, respectively; a compression spring between said element and said sleeve to spring load said sleeve; an elongated micrometer nut threadedly engaged with said end of said element and bearing against said spring loaded sleeve, said elongated micrometer nut being so constructed and arranged that it always extends beyond the end of said element an amount equal to the distance between the shoulders of said flanges; and a sheave threadedly engaged with said sleeve to force the inner race of said second ball-bearing against the flange of said sleeve, and adapted to receive a predetermined torque.

5. A gage comprising an axis member having means thereon for fixedly positioning thereagainst the inner race of a first bearing, an axially shiftable member carried by said axis member and having means for fixedly positioning thereagainst the inner race of a second bearing spaced from said first bearing, and means axially adjustably mounted on said axis member for bearing against said shiftable member, the position of said last-named means with respect to said axis member indicating the distance between the ends of the first and second-mentioned means against which are positioned their respective races.

6. A gage according to claim 5, and resilient means between said members to load said shiftable member.

7. A gage comprising an axis member having means thereon for positioning thereagainst a race of a first bearing, a slidable member on said axis member having means for positioning thereagainst a race of a second bearing spaced from said first bearing, and means axially adjustably mounted on said axis member for bearing against said slidable member, the position of said last-named means with respect to said axis member indicating the distance between the ends of the first and second-mentioned means against which are positioned their respective races.

8. A gage according to claim 7, and resilient means between said members to load said slidable member.

9. A gage, comprising an axis member having a two-step portion intermediate the ends thereof comprising a journal and a flange for receiving a first ball-bearing thereon and thereagainst, respectively; a sleeve slidably engaged on one end of said member and having a two-step end portion comprising a journal and a flange for receiving a second ball-bearing thereon and thereagainst, respectively; and means threadedly engaged with said axis member at said one end and bearing against said sleeve, said means being constructed to extend beyond said one end of said member an amount equal to the distance between the shoulders of said flanges.

10. A gage comprising an axis member having a flange intermediate the ends thereof for receiving a first ball-bearing thereagainst; a sleeve slidably mounted on one end of said member and having a flange at one end thereof for receiving thereagainst a second ball-bearing; and means axially adjustably mounted at said one end of said member and bearing against said sleeve, said means being constructed to extend beyond said one end of said member a distance equal to the distance between the shoulders of said flanges.

JACK E. SURLINE.

REFERENCES CITED

The following references are of record in the file of this patent:

UNITED STATES PATENTS

| Number | Name | Date |
|---|---|---|
| 448,089 | Starrett | Mar. 10, 1891 |
| 455,644 | Sloane | July 7, 1891 |
| 1,435,428 | Stromgren | Nov. 14, 1922 |
| 1,550,671 | Brault | Aug. 25, 1925 |
| 1,868,675 | Spase | July 26, 1932 |
| 1,935,678 | Valpey | Nov. 21, 1933 |
| 2,118,756 | Bergert | May 24, 1938 |
| 2,145,841 | Walters | Jan. 31, 1939 |
| 2,170,493 | Clapper | Aug. 22, 1939 |